Patented Oct. 1, 1940

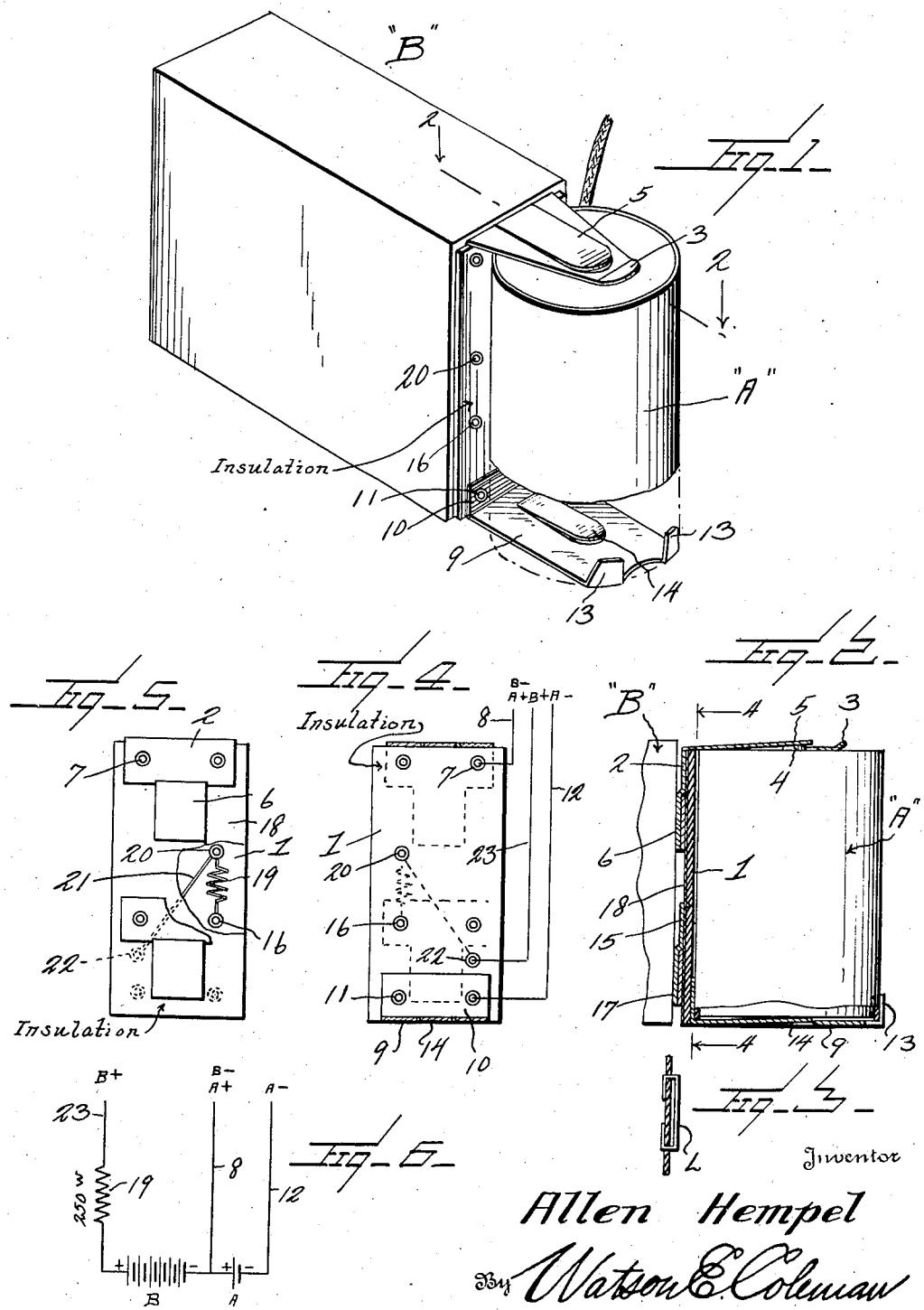

2,216,666

UNITED STATES PATENT OFFICE 2,216,666

BATTERY CONNECTING MEANS

Allen Hempel, Minneapolis, Minn.

Application May 25, 1939, Serial No. 275,749

5 Claims. (Cl. 136—171)

This invention relates generally to devices known as hearing aids by means of which persons having defective hearing are assisted in the hearing of speech or other sounds, and pertains particularly to an improved means for connecting together the electric batteries which are used in connection with such devices.

Electrically operated hearing aid devices make use of an electric amplifying mechanism which includes in some cases a vacuum tube which requires the use of "A" and "B" batteries. At the present time, such batteries are mounted in or supported in cases or frames and such cases or frames add materially to the weight of the device and, therefore, make the hearing aid device heavy and awkward to wear.

The present invention has for its primary object to provide a connector means between such batteries which serves the double function of securing the batteries together and of providing an electrical connection with the same, whereby the electrical circuit of the device may be conveniently coupled to the batteries and the batteries will be securely joined together by a relatively light weight member which does not materially increase the total weight of the device which the user has to carry.

Another object of the invention is to provide an improved mechanical and electrical coupling means for a pair of batteries of the character described, which is so designed that either of the batteries may be easily and quickly attached or detached as necessity may require, without having to disturb the attachment of the other battery to the connector.

The invention will be best understood from a consideration of the following detailed description of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 illustrates the application of the device embodying the present invention, the same with a pair of batteries being shown in perspective.

Fig. 2 is a sectional view taken substantially on the line 2—2 of Fig. 1 and passing only through the connector.

Fig. 3 is a view illustrating a terminal clip for a "B" battery with which an element of the connector is joined.

Fig. 4 is a sectional view on the line 4—4 of Fig. 2.

Fig. 5 is a view in elevation of the rear side of the connector.

Fig. 6 is an electrical diagram showing the connections between the batteries as established by the use of the connector device.

Referring now more particularly to the drawing, the two batteries which the present device is designed to couple together are indicated by the characters A and B, the characters representing respectively the "A" and "B" batteries of the circuit of Fig. 6. The "A" battery is of the standard one cell type commonly employed in flashlights, while the "B" battery may be designed particularly for use in connection with the hearing aid unit and as so designed it would be provided with terminals B+ and B— of a suitable form to facilitate the attachment of the battery connecting means thereto, one form of such means being here illustrated as bands or loops L, as shown particularly in Fig. 3, which stand away from the casing of the battery sufficiently to facilitate the connection therewith of a coacting part of the connecting unit.

The connecting or coupling unit embodying the present invention comprises a plate 1 of insulation material which is of a size to position against the top end of the "B" battery in the manner shown in Fig. 1. This plate has secured to the rear side at one end the terminal plate 2, which is of metal and which has an arm portion 3 extended across the adjacent end edge of the insulation plate to extend perpendicularly with respect thereto. This arm 3 constitutes the positive "A" battery terminal and is adapted to engage over the central terminal post 4 of the "A" battery, as illustrated in Figs. 1 and 2. In order that a positive connection may be established between the arm 3 and the "A" battery post 4, the arm 3 has a tongue struck out therefrom, as indicated at 5, so that the post 4 may engage in the opening thus formed and the tongue 5 will serve as a spring connector for maintaining a good electrical connection with the battery terminal.

The plate 2 at the rear side of the insulation body or plate 1, is suitably formed to provide, or carries, a suitable means for facilitating its connection with the terminal member L of the "B" battery, such means here being in the form of a tongue 6 which is adapted to slip through the loop L.

The plate 2 may be secured in any suitable manner to the insulation body 1 as by the use of the metallic rivets 7, one of which may be employed for the electrical connection with the plate 2 of a wire 8 which forms the A+ B— lead for the electrical unit with which the batteries are to be connected.

At the opposite end of the insulation body 1 from the arm 3, there is secured what may be termed a bottom arm or bracket in the form of a relatively wide plate 9, an end portion of the plate being turned to form the angle 10 which is secured to the insulation body 1 by the metallic rivets 11. One of these rivets has connected thereto a wire 12 constituting the A— lead to the electrical mechanism. The bottom arm or bracket 9 is provided at its outer end with the upstanding fingers 13 between which and the body of insulation 1, the lower end or bottom of the "A" battery is held. In order to insure a good electrical connection between the negative side of the "A" battery and the arm 9, there is struck from the arm the upwardly projecting tongue 14 which engages the metallic bottom of the "A" battery.

At the back of the insulation body 1, a terminal plate 15 is secured by the metal rivets 16. This plate, like the plate 2, is also suitably formed to facilitate its attachment with the positive terminal of the "B" battery, it here being shown as a tongue 17 which engages through the loop L.

The body 1 has interposed between it and the plates 2 and 15, a sheet of insulation which is shown in section in Fig. 2, and is indicated by the numeral 18. In Fig. 5, this sheet of insulation is broken away to show a resistor 19 which is held between it and the main body 1, and which is connected at one end with a rivet 16 by which it is electrically coupled with the "B" positive terminal while its other end is connected with a similar rivet, indicated by the numeral 20, and this rivet is joined by a conductor 21 with a terminal rivet 22 which is secured in the insulation body 1 and is covered at the back of the body by the insulation sheet 18. With this terminal rivet 22 is connected the wire 23 which forms the "B" positive lead from the "B" battery to the hearing aid device with which the batteries may be connected.

From the foregoing, it will be readily apparent that the device herein described provides a light but positive means of mechanically coupling together the "A" and "B" batteries of a unit of the character referred to so that they may be conveniently carried in the form of a single body without necessitating the use of heavy supporting frames or containers, and the device also constitutes a convenient means for electrically coupling the terminals of the batteries in such a manner as to facilitate the connection of such terminals with the amplifier unit with which the batteries are used.

While the "B" battery has been described as having positive and negative terminals in the form of loops and the connector unit plates 2 and 15 have been shown and described as having offset tongues for connection through the loops L, it is to be understood that this has merely been illustrated as one form of connecting means which may be employed between the connecting unit and the "B" battery. Other suitable detachable connections might be employed, therefore, it is to be understood that the invention is not to be considered as limited to the specific coupling means shown.

What is claimed is:

1. The combination with an "A" battery having electrical terminals at two opposite ends and a "B" battery having a pair of electrical terminals on one side, of a flat body of insulation material designed to be disposed over the "B" battery terminals, a conductor plate secured to the side of the body next to the "B" battery and at one end of the body and having a current conducting arm extending perpendicularly to the body and away from the "B" battery, a second current conducting arm secured at one end to the side of the body opposite the side to which the plate is attached and substantially paralleling the first arm, said "A" battery being disposed between and mechanically held by said arms with the said terminals thereof each engaging an arm, a second plate secured to the same side of the battery as the first plate, means electrically coupled with each of said plates having electrical connection with the terminals of the "B" battery, said means also mechanically securing said flat body to the "B" battery, and means for electrically connecting a current conductor to each of said plates and to the second arm.

2. As an article of manufacture for electrically and mechanically connecting "A" and "B" batteries together, a flat rigid body of insulation, an arm secured to the body and extending outwardly from one side face of said body perpendicularly thereto, a second arm secured to the body and extending outwardly from the said one side face thereof and parallel to the first arm, said arms being of current conducting material, a pair of elements secured to the body upon the side face opposite from the said face from which the arms extend and adapted for electrical connection with the two terminals of a "B" battery and for rigidly securing the body to the "B" battery, one of said elements being electrically joined with an arm, said arms being of resilient material and one thereof having angularly turned terminal fingers between which and the body an "A" battery may be held, a resistor connected at one end with the other one of said elements, a wire terminal electrically connected with the other end of the resistor, a wire terminal electrically connected with the electrically joined arm and element, and a wire terminal electrically connected with the other arm.

3. A device for electrically and mechanically joining together two batteries, comprising a flat rigid plate of insulation material, a metal conductor plate secured to one side of the insulation plate and having an integral portion extending across an edge of the insulation plate to provide a resilient arm disposed perpendicular to the face of plate opposite to the said one side, said metal plate being formed to provide a tongue extending in spaced parallel relation with the side of the insulation plate to which the metal plate is attached, a second metal plate secured to said one side of the insulation plate to which the first metal plate is secured and having a tongue disposed in offset parallel relation with the insulation plate, a second metal arm secured at one end to the side of the insulation plate opposite from said tongues and having spaced parallel relation with the first arm, said arms being designed to receive a battery therebetween to secure the insulation plate thereto and to electrically connect with the terminals of the same, said tongues being designed for electrical connection with the terminals of the other battery and to rigidly secure the insulation plate thereto, a sheet of insulation interposed between said metal plates and the insulation plate, a resistor secured between the sheet of insulation and the insulation plate and electrically connected at one end with the second-mentioned metal plate, and means for electrically coupling current conductors with the first-mentioned plate, the second-mentioned arm and the other end of said resistor.

4. A device of the character described, comprising a flat rigid plate of insulation material, an electric current conducting arm secured to said plate adjacent one end edge and extending in perpendicular relation with and beyond one side face of the plate, a second current conducting arm secured to the plate and extending in parallel relation with the first arm and perpendicular to and beyond the said one side face of the plate, said arms being adapted to secure an electric battery between and in electrical connection with them, a pair of electric current conducting terminals secured to the plate upon the side face opposite from the first-mentioned face, one of said terminals being electrically connected with the first arm, said terminals each including a current conducting plate in offset relation with the adjacent body face for connection with a battery terminal, means carried by the insulation plate facilitating the electrical connection of a current conducting wire to each of said arms, a sheet of insulation material interposed between the said terminals and the insulation plate, an electric current resistance element secured between and covered by said sheet and insulation plate and electrically coupled at one end with the other one of the terminals, and means carried by the insulation plate facilitating the electrical connection of a current conducting wire to the other end of said resistance element.

5. Means for establishing an electrical connection between an "A" battery and a "B" battery and in combination, the "B" battery having positive and negative terminals upon one side thereof, comprising a body of insulation formed to position against the said side of the "B" battery and to cover the terminals thereof, a pair of metallic terminals carried by the said body on one side thereof for electrical connection with said "B" battery terminals, the pair of body carried terminals rigidly securing the body to the "B" battery terminals and in close proximity to the said side of the "B" battery, a pair of elongated metallic terminals secured to the insulation body in spaced relation with one another and extending perpendicularly with respect to and outwardly from that side face of the insulation body which is opposite the side carrying the first-mentioned pair of metallic terminals, the second-mentioned pair of terminals being constructed and arranged to receive and hold an "A" battery therebetween, said second-mentioned pair of terminals being constructed to establish an electrical connection with the positive and negative terminals of the "A" battery and to secure the "A" battery to the body, means electrically connecting together that body supported terminal which connects with the positive terminal of the "A" battery and that body supported terminal which connects with the negative terminal of the "B" battery, means for connecting a current conductor with the two electrically connected terminals, and means for connecting a current conductor to each of the two remaining body carried terminals.

ALLEN HEMPEL.